United States Patent
Erlich et al.

(10) Patent No.: US 8,595,402 B1
(45) Date of Patent: Nov. 26, 2013

(54) DYNAMIC ARBITRATION SCHEMES FOR MULTI-MASTER MEMORY SYSTEMS

(75) Inventors: Uri Erlich, Matan (IL); Udi Shtalrid, Moshav Nir-Israel (IL)

(73) Assignee: Marvell International Ltd., Hamilton (BM)

( * ) Notice: Subject to any disclaimer, the term of this patent is extended or adjusted under 35 U.S.C. 154(b) by 329 days.

(21) Appl. No.: 13/038,401

(22) Filed: Mar. 2, 2011

Related U.S. Application Data

(60) Provisional application No. 61/309,805, filed on Mar. 2, 2010, provisional application No. 61/438,794, filed on Feb. 2, 2011.

(51) Int. Cl.
*G06F 13/00* (2006.01)
*G06F 12/00* (2006.01)

(52) U.S. Cl.
USPC ............ 710/244; 710/107; 710/111; 710/240

(58) Field of Classification Search
USPC .......................... 710/240–244, 111
See application file for complete search history.

(56) References Cited

U.S. PATENT DOCUMENTS

| | | | | |
|---|---|---|---|---|
| 6,385,678 B2 * | 5/2002 | Jacobs et al. | ................ | 710/113 |
| 7,350,004 B2 * | 3/2008 | Fukuyama et al. | ............ | 710/241 |
| 7,512,729 B2 * | 3/2009 | Bose et al. | ................... | 710/111 |
| 7,533,206 B2 * | 5/2009 | Murakami et al. | ............ | 710/113 |
| 7,617,344 B2 * | 11/2009 | Nozaki et al. | ................. | 710/240 |
| 7,664,901 B2 * | 2/2010 | Riocreux et al. | ............... | 710/244 |
| 7,804,735 B2 * | 9/2010 | Mao et al. | ................. | 365/233.13 |
| 7,913,014 B2 * | 3/2011 | Sama | ............................ | 710/117 |
| 8,065,458 B2 * | 11/2011 | Nagao et al. | ................... | 710/244 |
| 8,156,273 B2 * | 4/2012 | Moran et al. | ................... | 710/110 |
| 8,285,912 B2 * | 10/2012 | Feero et al. | .................... | 710/316 |
| 2008/0086572 A1 * | 4/2008 | Tune et al. | .................... | 709/238 |
| 2009/0070493 A1 * | 3/2009 | Riocreux et al. | ................ | 710/16 |

OTHER PUBLICATIONS

ARM Limited, "PrimeCell® High-Performance Matrix (PL301)", Revision: r1p2, Technical Summary, years 2006-2008.
ARM Limited, "AMBA® Network Interconnect (NIC-301)", Revision: r2p0, Technical Reference Manual, years 2006-2009.
ARM Limited, "AMBA® AXI Protocol", v1.0, Specification, years 2003-2004.
ARM Limited, "AMBA™ APB Protocol", v1.0, Specification, years 2003-2004.

* cited by examiner

*Primary Examiner* — Brian Misiura

(57) ABSTRACT

Apparatus includes a plurality of ports and arbitration circuitry. The plurality of ports is configured to connect a memory to a respective plurality of processing units that are configured to access the memory. The arbitration circuitry is configured to grant the processing units access to the memory via the ports in accordance with an arbitration scheme including multiple, alternating priority periods, such that in each priority period a respective processing unit is assigned an absolute priority over others of the processing units and the others of the processing units are assigned predefined relative priorities over one another.

20 Claims, 4 Drawing Sheets

DYNAMIC ARBITRATION SCHEMES FOR MULTI-MASTER MEMORY SYSTEMS

CROSS-REFERENCE TO RELATED APPLICATIONS

This application claims the benefit of U.S. Provisional Patent Application 61/309,805, filed Mar. 2, 2010, and of U.S. Provisional Patent Application 61/438,794, filed Feb. 2, 2011, whose disclosures are incorporated herein by reference.

FIELD OF THE DISCLOSURE

The present invention relates generally to memory access, and particularly to methods and systems for arbitrating memory access transactions.

BACKGROUND

Various bus architectures and interconnect schemes are known in the art. Such schemes are used, for example, in the design of Integrated Circuits (IC) and Systems-on-Chip (SoC). For example, ARM Ltd. (Cambridge, England) offers a bus architecture called Advanced Microcontroller Bus Architecture (AMBA). The AMBA architecture includes an interconnect protocol called Advanced eXtensible Interface (AXI), which is targeted at high-performance, high-frequency system designs and includes a number of features for a high-speed submicron interconnect. The AMBA AXI protocol is specified in an ARM specification entitled "AMBA AXI Protocol," version 1.0, 2004, which is incorporated herein by reference.

Another part of the AMBA protocol family is the Advanced Peripheral Bus (APB) protocol, which aims to provide a low-cost interface that is optimized for minimal power consumption and reduced interface complexity. APB is specified in an ARM specification entitled "AMBA 3 APB Protocol," version 1.0, 2004, which is incorporated herein by reference.

ARM also offers a configurable auto-generated AMBA 3 bus subsystem called High-Performance Matrix (HPM), which is based on an AXI cross-bar switch. The HPM product is described in an ARM Technical Summary entitled "PrimeCell High-Performance Matrix (PL301)," revision r1p2, 2008, which is incorporated herein by reference. Yet another product is the AMBA Network Interconnect, which is a configurable component for creating AMBA-compliant network infrastructure. This component is described in an ARM Technical Reference Manual entitled "AMBA Network Interconnect (NIC-301)," revision r2p0, 2009, which is incorporated herein by reference.

The description above is presented as a general overview of related art in this field and should not be construed as an admission that any of the information it contains constitutes prior art against the present patent application.

SUMMARY

An embodiment that is described herein provides an apparatus including a plurality of ports and arbitration circuitry. The plurality of ports is configured to connect a memory to a respective plurality of processing units that are configured to access the memory. The arbitration circuitry is configured to grant the processing units access to the memory via the ports in accordance with an arbitration scheme including multiple, alternating priority periods, such that in each priority period a respective processing unit is assigned an absolute priority over others of the processing units and the others of the processing units are assigned predefined relative priorities over one another.

In some embodiments, the arbitration circuitry is configured to measure each priority period by counting a respective predefined number of memory access transactions applied by the processing units. In an embodiment, the arbitration circuitry includes a Round-Robin arbiter that is configured to apply Round-Robin scheduling to memory access transactions issued by the processing units to the memory; and external circuitry, which is connected to the Round-Robin arbiter and is configured to cause the Round-Robin arbiter to apply the alternating priority periods.

In a disclosed embodiment, the Round-Robin arbiter is configured to apply the Round-Robin scheduling within each of multiple priority groups to which the processing units are classified, and the external circuitry is configured to cause the Round-Robin arbiter to apply the alternating priority periods by alternately modifying a classification of the processing units to the priority groups. In an example embodiment, in preparation for each priority period, the external circuitry is configured to classify the respective processing unit having the absolute priority to a priority group having a highest priority.

In another embodiment, the external circuitry is configured to force the Round-Robin arbiter, during the entire duration of each priority period, to assign a highest priority to the respective processing unit having the absolute priority for that priority period. In some embodiments, the Round-Robin arbiter operates in accordance with an Advanced eXtensible Interface (AXI) protocol.

In an embodiment, the arbitration circuitry is configured to apply during each priority period a round-robin scheme among the others of the processing units that are not assigned to absolute priority. In some embodiments, a mobile communication terminal includes the disclosed apparatus. In some embodiments, a chipset for processing signals in a mobile communication terminal includes the disclosed apparatus.

There is additionally provided, in accordance with an embodiment that is described herein, a method in a system that includes a plurality of processing units that access a memory. The method includes storing a definition of an arbitration scheme including multiple, alternating priority periods, such that in each priority period a respective processing unit is assigned an absolute priority over others of the processing units and the others of the processing units are assigned predefined relative priorities over one another. Transactions are accepted from the processing units for execution in the memory, and the transactions are scheduled for execution in the memory in accordance with the arbitration scheme.

There is also provided, in accordance with an embodiment that is described herein, a method including, for a system in which multiple processing units execute transactions in a memory, estimating statistical characteristics of the transactions that are applied by the respective processing units. An arbitration scheme is defined based on the estimated statistical characteristics. The arbitration scheme applies multiple priority periods for the respective processing units in alternation, such that in each priority period a respective processing unit is assigned an absolute priority over others of the processing units and the others of the processing units are assigned predefined relative priorities over one another. In some embodiments, estimating the statistical characteristics includes simulating the system using a behavioral simulation.

The present disclosure will be more fully understood from the following detailed description of the embodiments thereof, taken together with the drawings in which:

DETAILED DESCRIPTION OF EMBODIMENTS

Various electronic systems comprise a memory device that is accessed by multiple processing units. Such multi-master systems typically perform arbitration between the memory access transactions of the different processing units, for example in order to avoid collisions or otherwise regulate the access to the common memory resource. Embodiments that are described herein provide improved methods and systems for arbitration of memory access transactions. Although the disclosed embodiments relate to mobile communication terminals, the methods and systems described herein can be used in various other electronic systems.

Some types of memory devices incur considerable processing overhead when accessing non-contiguous or otherwise spread memory addresses. On the other hand, accessing contiguous memory areas, e.g., sequential memory addresses, is usually highly efficient. For example, the access throughput of Double Data Rate (DDR) and other Dynamic Random Access Memory (DRAM) devices is considerably degraded when accessing memory addresses that belong to different memory pages. This inefficiency is caused by the fact that data is read and written in entire memory page units, and that opening and closing of pages involves considerable wasting of bus cycles.

In some embodiments, arbitration circuitry receives from multiple processing units (referred to as masters) memory access transactions that access a memory. The arbitration circuitry schedules the memory access transactions for execution in the memory in accordance with an arbitration scheme that reduces or eliminates the above-described overheads. The arbitration scheme comprises multiple priority periods that are applied in alternation. In each priority period, one of the masters is given absolute unconditional priority over the other masters in accessing the memory. Each priority period is typically specified as a predefined number of memory access transactions.

The disclosed arbitration schemes assign to each master a relatively long priority period in which it has unrestricted priority over the other masters. The memory is therefore accessed with relatively long sequences of transactions originating from the same master. When using such an arbitration scheme, there is high likelihood that consecutive transactions will address contiguous (or at least nearby) memory addresses. As a result, the memory is accessed with high efficiency and few wasted cycles.

Several example embodiments that implement the disclosed arbitration schemes using the ARM AMBA AXI environment are described below. Alternatively, however, the disclosed techniques can be implemented using any other suitable bus architecture or protocol.

Figure 1:
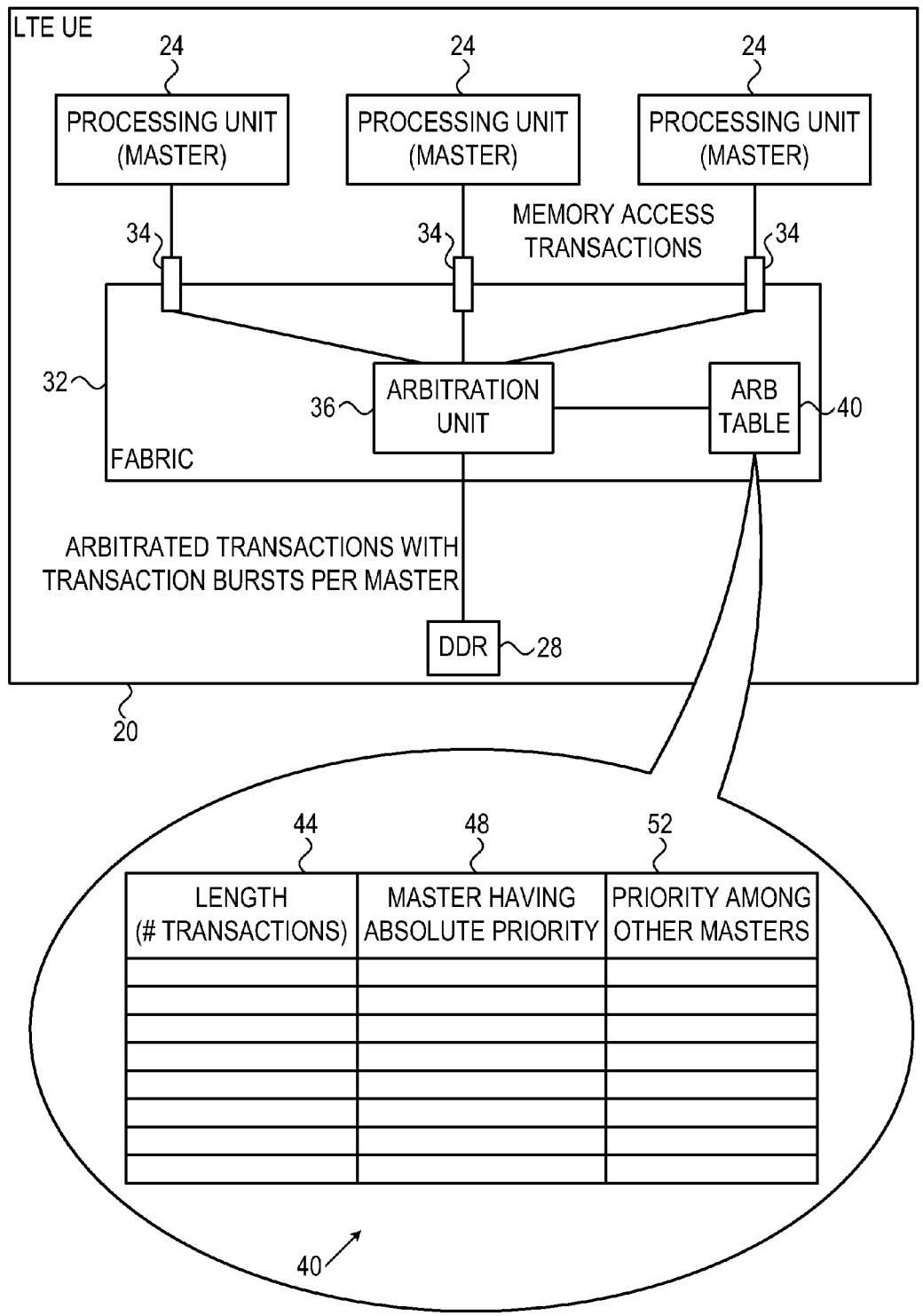
FIG. 1 is a block diagram that schematically illustrates a memory access arbitration scheme in a mobile communication terminal, in accordance with an embodiment that is described herein.

FIG. 1 is a block diagram that schematically illustrates a memory access arbitration scheme in a mobile communication terminal 20, in accordance with an embodiment that is described herein. In the present example, terminal 20 comprises an Evolved-UMTS Terrestrial Radio Access (E-UTRA—also known as Long-Term Evolution—LTE) User Equipment (UE). Alternatively, terminals 20 may comprise a terminal of any other suitable communication standard or protocol. Further alternatively, the disclosed techniques can be applied in any other suitable electronic system.

UE 20 comprises multiple processing units (referred to herein as masters) 24 that access a DDR memory 28 via an interconnection fabric 32. In some embodiments fabric 32 complies with the AMBA AXI protocol, cited above. In other embodiments, any other suitable fabric type can be used. The present example refers to three masters that access a single memory for the sake of clarity. In alternative embodiments, UE 20 may comprise any suitable number of masters that access any suitable number of memory devices.

Masters 24 may comprise any suitable kind of processing unit, such as, for example, applications processors, communication processors, digital signal processing cores, physical layer accelerators compliant with specific communications standards, MIPI standard modules, DMAs, and/or any other suitable units that are capable of sharing a memory device. Although the present embodiment is described in the context of a DDR memory, in alternative embodiments the memory that is accessed by the masters may comprise any other suitable type of memory, such as other solid state memory devices (e.g., Flash devices), Flash drives, solid state drives or hard disk drives. In some embodiments, masters 24 access one or more slave devices (not shown in the figure) in addition to accessing DDR 28.

Fabric 32 comprises ports 34 and an arbitration unit 36. Ports 34 are configured to connect the fabric to masters 24. The arbitration unit receives memory access transactions (e.g., read commands and write commands) from masters 24 via ports 34, and schedules the transactions for execution in DDR 28 in accordance with a predefined arbitration scheme. The arbitration scheme comprises multiple priority periods that are applied in periodic alternation. In each priority period, one of masters 24 is assigned absolute priority over the other masters in accessing DDR 28. When the priority periods are applied in alternation, each of the masters is assigned a respective priority period in which it is given unrestricted priority in accessing the DDR.

In the embodiment of FIG. 1, all arbitration functions are implemented in fabric 32. In alternative embodiments, at least some of the arbitration functions are implemented by circuitry that is external to the fabric. In an example embodiment, the arbitration schemes described herein are implemented by adding external logic to conventional AXI-compliant fabric. Example embodiments of this kind are described in detail in FIGS. 2 and 3 below.

In some embodiments, the parameters of the arbitration scheme are stored in an arbitration table that is accessible to arbitration unit 36. In the present example, table 40 comprises multiple entries, each entry specifying a respective priority period. Each entry comprises a length field 44, an absolute priority field 48 and a relative priority field 52. Length field 44 defines the length of the priority periods (e.g., the number of transactions in the priority period). Absolute priority field 48 indicates the master that has absolute priority in this priority period. Relative priority field defines relative priorities among the other masters (the masters that are not assigned the absolute priority in this priority period).

Note that the number of entries in table 40 is not necessarily equal to the number of masters. For example, in some embodiments the arbitration scheme comprises more than one priority period (and therefore more than one entry in table 40) for a given master.

Once initialized with the appropriate arbitration table, arbitration unit 36 schedules the memory access transactions issued by masters 24 in accordance with the arbitration scheme. Consider, for example, the following arbitration table for three masters 24 denoted M1 . . . M3:

TABLE 1

Example arbitration table

| # Transactions | Master having absolute priority | Priority among other masters |
|---|---|---|
| 10 | M1 | M2, then M3 |
| 4 | M2 | M3, then M1 |
| 16 | M3 | M2, then M1 |

The arbitration scheme in this example has an overall period of thirty memory access transactions, which is divided into three priority periods. Arbitration unit 36 typically counts the number of transactions issued to the DDR by the three masters, and uses this count to apply the priority periods. During the first ten transactions (first table entry), absolute priority is given to master M1. In other words, any transaction of master M1 will be served immediately. Transactions of masters M2 and M3 will be served only if no transaction of master M1 is pending. In such a case, M2 will have higher priority than M3.

During the following four transactions (second table entry), absolute priority is given to master M2. In the absence of pending transactions of M2, transactions of M1 and M3 will be served with M3 having higher priority than M1. During the following sixteen transactions (third table entry), absolute priority is given to master M3. When no M3 transactions are pending, transactions of M1 and M2 will be served with M2 having higher priority than M1.

The arbitration scheme of Table 1 is shown purely by way of example. In alternative embodiments, any other number of masters, number of table entries (i.e., number of priority periods), number of transactions per priority period and/or relative priority scheme can be used. In an example embodiment, in a given priority period, the masters that do not have absolute priority are scheduled using a Round-Robin (RR) or weighted RR scheme. When using weighted RR, it is possible to use different weights in different priority periods.

As can be seen in Table 1 above, the arbitration scheme gives each master the opportunity to execute a relatively long sequence of transactions without intervening transactions of other masters. Thus, there is high likelihood that the memory will be operated efficiently and with minimal overhead.

In an example embodiment, each master is assigned a respective contiguous address space. In this embodiment, a sequence of transactions originating from the same master is likely to address successive, or at least nearby memory addresses. The arbitration scheme is therefore likely to minimize processing overhead in DDR 28.

The length of the priority period for each master can be determined in various ways. The priority period length depends on a variety of parameters and characteristics of the specific master, of the other masters and of the entire system. In some embodiments, the priority period length for each master is chosen to be the maximal possible period that does not violate the latency restrictions for that master. This selection enables minimizing the opening and closing of DDR Synchronous DRAM (SDRAM) pages (which reduces the DDR usability due to the overhead of alternating among masters) without risk of "starvation" scenarios. In real-life systems having several masters, the priority period lengths are typically determined by simulating the masters and their memory access characteristics using a suitable simulation tool.

The UE, fabric and arbitration unit configurations seen in FIG. 1 are example configurations, which are depicted solely for the sake of clarity. In alternative embodiments, any other suitable configurations can also be used. Elements that are not mandatory for understanding of the disclosed techniques have been omitted from the figures for the sake of clarity.

The different elements shown in FIG. 1 are typically implemented using dedicated hardware, such as using one or more Application-Specific Integrated Circuits (ASICs) and/or Field-Programmable Gate Arrays (FPGAs). Alternatively, some elements may be implemented using software executing on programmable hardware, or using a combination of hardware and software elements.

In some embodiments, some or all of the elements of UE 20, including the masters, memory and arbitration unit, are fabricated in a chip-set. When implementing some or all of the disclosed techniques in software on a programmable processor, the software may be downloaded to the processor in electronic form, over a network, for example, or it may, alternatively or additionally, be provided and/or stored on non-transitory tangible media, such as magnetic, optical or electronic memory.

Figure 2:
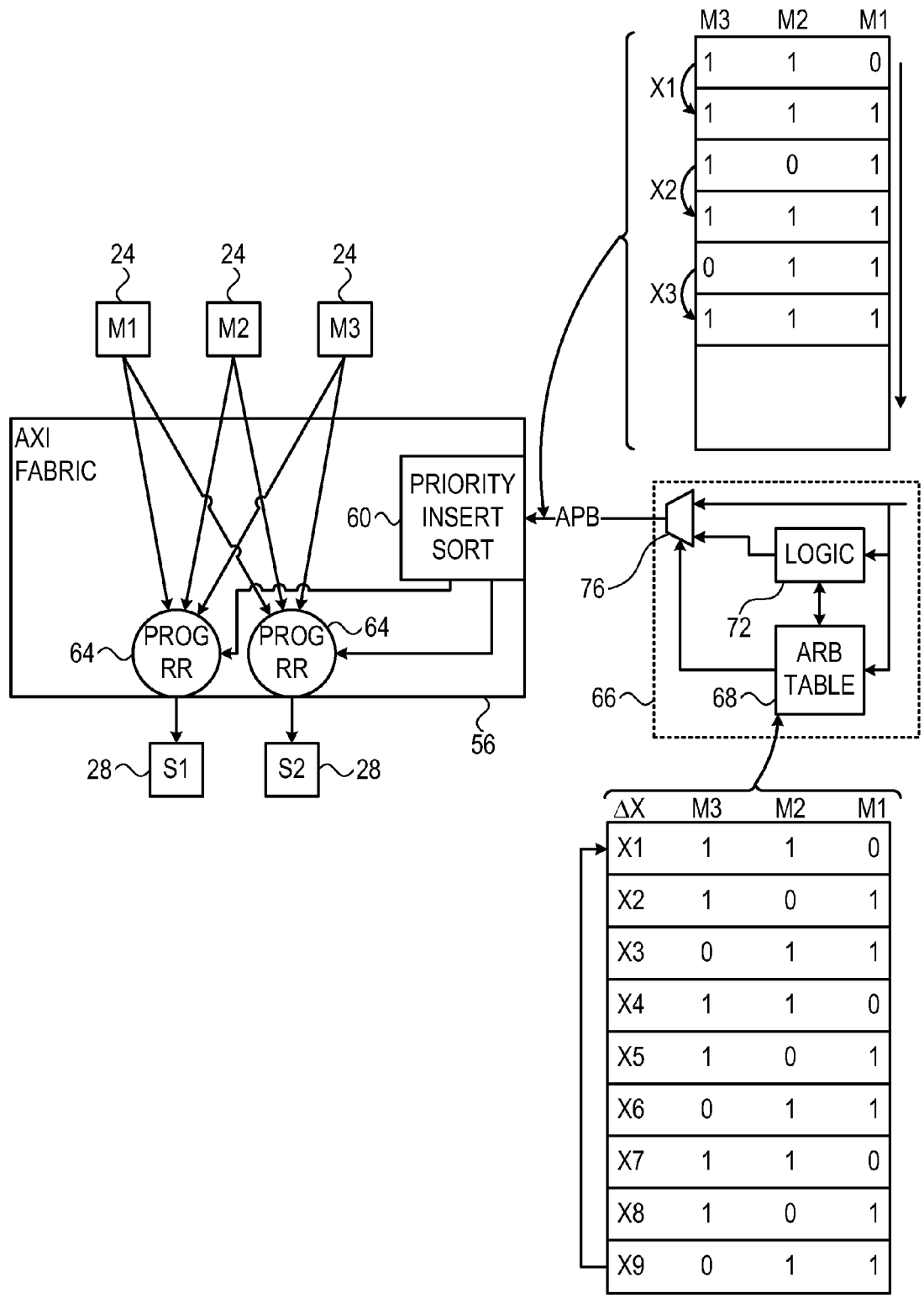
FIGS. 2 and 3 are block diagrams that schematically illustrate arbitration circuitry, in accordance with embodiments that are described herein.

FIG. 2 is a block diagram that schematically illustrates arbitration circuitry, in accordance with an embodiment that is described herein. In the embodiment of FIG. 2, the disclosed arbitration schemes are implemented using a fabric 56 that is compliant with the AXI protocol, cited above. Fabric 56 is referred to as an "AXI fabric" for clarity. In one embodiment, fabric 56 comprises an ARM PrimeCell HPM (PL301), as cited above. Additional external circuitry is coupled to AXI fabric 56 in order to implement the alternating priority periods described above. In the example of FIG. 2, three masters 24 denoted M1 . . . M3 access two slave devices (e.g., DDR 28) denoted S1, S2 via fabric 56.

In accordance with the AXI architecture, fabric 56 comprises a priority insert sorting module 60, which holds a classification of the masters into priority groups. In an embodiment, the classification is defined such that lower group index corresponds to higher priority (group 0 is the highest priority group). Fabric further comprises a respective programmable Round-Robin (RR) module 64 for each slave 28. The RR module is also referred to as a RR arbiter. The RR module of a given slave (e.g., DDR) receives the transactions issued to that slave by masters 24, and schedules the transactions for execution using RR scheduling.

Each RR module 64 is notified by module 60 of the classification of the masters into the priority groups. The RR scheduling is carried out by module 64 within each priority group. In a typical flow, RR module of a given slave 28 schedules the transactions by initially serving priority group 0 by performing RR scheduling within the masters belonging to group 0, then serving priority group 1 by performing RR scheduling within the masters belonging to group 1, and so on. Within a given priority group, once the RR module executes a certain transaction, the corresponding master is downgraded to the lowest RR priority so that the other masters in this priority group will be served first.

Generally, AXI fabric 56 does not support the disclosed arbitration schemes, having alternating priority periods, but rather carries out conventional RR scheduling within priority groups. In the embodiment of FIG. 2, the disclosed arbitration schemes are implemented by coupling external circuitry 66 to AXI fabric 56. External circuitry 66 comprises an arbitration table 68 that holds the arbitration scheme parameters, logic 72 that in an embodiment monitors (e.g., counts) the number of transactions, and a multiplexer (MUX) 76 that interfaces with AXI fabric 56 using the APB protocol, cited above.

In this embodiment, the alternating priority periods are implemented by modifying the classification of the masters to the priority groups in alternation, in real time during operation. In order to apply a certain priority period, the master having absolute priority during this period is classified into group 0, and the other masters are classified into group 1.

Table 68 holds a list of these classifications for the various priority periods. X1, X2, X3 . . . X9 denote the priority period lengths, i.e., the number of transactions per priority period. (In the present example table 68 holds nine entries corresponding to nine priority periods. Alternatively, any other suitable number of priority periods can be defined.) Logic 72 counts the number of transactions. When a new priority period is to be initiated, logic 72 triggers MUX 76 to send the next entry of table 68 to module 60 of the AXI fabric.

In other words, external circuitry 66 re-initializes the AXI fabric with a new classification of priority groups at the beginning of each priority period. The new classification maps the master having the absolute priority to group 0, and the other masters to group 1. When the AXI fabric performs arbitration under this classification, it will assign the master in group 0 absolute priority (since it is the only master in this group), and apply RR scheduling among the other masters. When the external circuitry modifies the classification in preparation for the next priority period, another master will be mapped (alone) to group 0 in order to give it absolute priority.

In some embodiments, the initialization of each priority period is performed in two phases, as illustrated by the table at the top-right of FIG. 2. In the first phase all masters are set to group 1, and in the second phase the master having absolute priority in the new priority period is set to group 0. This scheme is used, for example, when the internal registers of module 60 can only be modified one at a time.

In some embodiments, logic 72 determines the total number of transactions arriving from masters 24. In other embodiments, logic 72 determines only the number of transactions that are addressed to the DDR in question (e.g., S1 or S2). Note, however, that the embodiment of FIG. 2 applies absolute priority to all slaves, i.e., affects all RR modules 64. In some embodiments this effect can be tolerated, and this scheme is certainly useful when fabric 56 serves only one slave.

Figure 3:
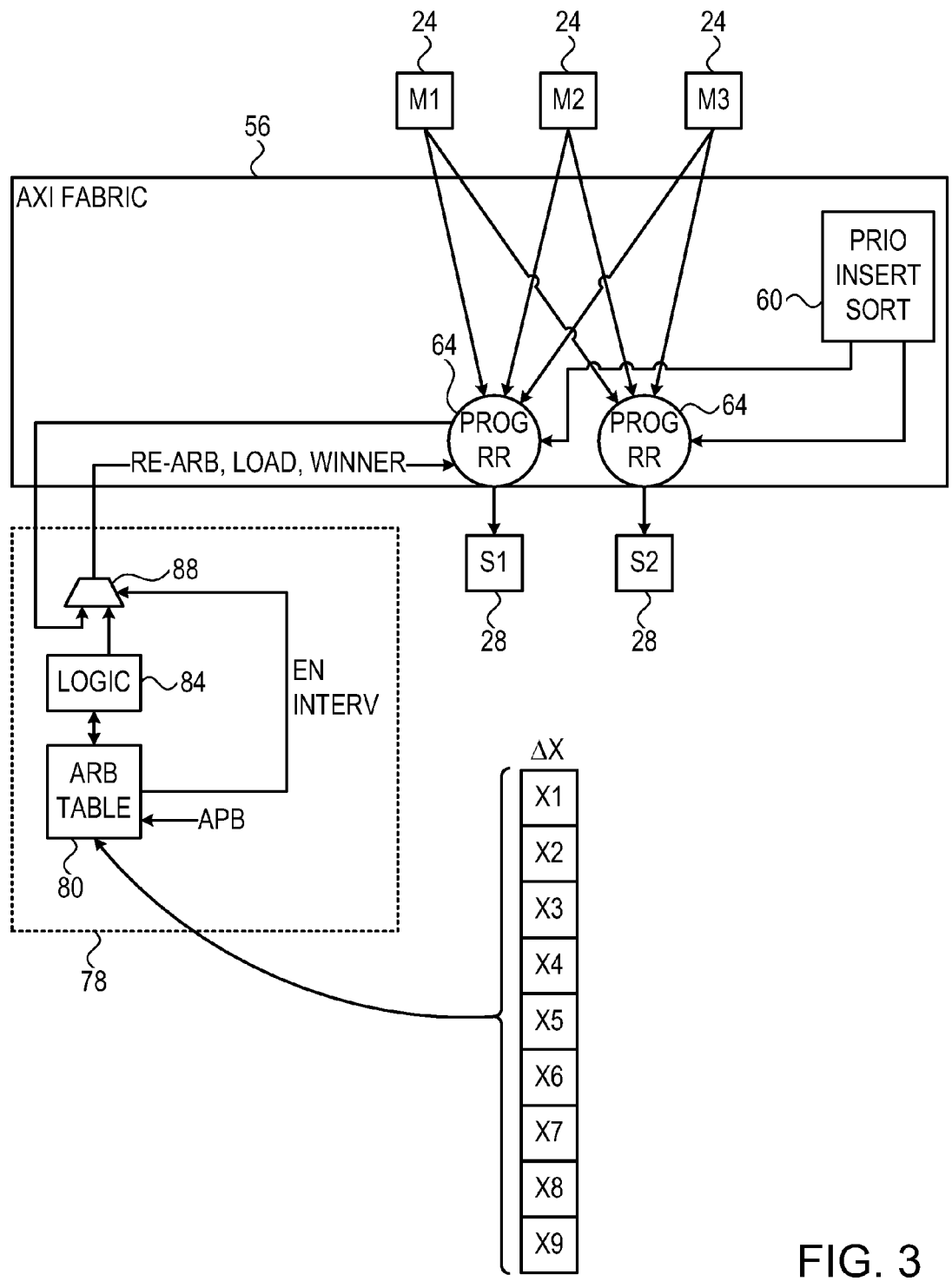

FIG. 3 is a block diagram that schematically illustrates alternative arbitration circuitry, in accordance with an alternative embodiment that is described herein. Similarly to the embodiment of FIG. 2, the embodiment of FIG. 3 implements the disclosed arbitration schemes, having alternating priority periods, using conventional AXI fabric 56. Unlike the embodiment of FIG. 2, however, the present embodiment controls only the RR module of the DDR in question (S1 in this example), and not all slaves. This configuration may therefore be useful when serving multiple slaves 28. On the other hand, the configuration of FIG. 3 may involve non-standard interfacing with the AXI fabric, for example interception of internal signals that control RR module 64.

In the embodiment of FIG. 3, External circuitry 78 is coupled to AXI fabric 56. External circuitry 78 comprises an arbitration table 80, logic 84 and a MUX 88. The external circuitry modifies some of the internal signals of RR module 64, and modifies the RR process performed by the RR module, in order to apply alternating periods of absolute priority. The RR module uses three signals denoted RE-ARB, LOAD and WINNER to carry out the RR scheduling. The RE-ARB signal causes the RR module to move the master that was recently served to lowest priority in order to allow the other masters to be served in the next RR cycles. The WINNER signal indicates the master that was served and is to be moved to the lowest priority. The LOAD signal synchronizes these actions.

In the present embodiment, all masters are classified in the same priority group (e.g., group 0) and this classification remains constant. Logic 84 counts the number of transactions that arrive in this specific RR module, i.e., only the transactions addressed to the DDR. The RE-ARB signal is masked and does not trigger the RR module after every transaction. Instead, MUX 88 allows the RE-ARB signal to reach the RR module only after Xi transactions, i.e., only at the end of each priority period. When the RE-ARB signal is allowed to reach the RR module, the WINNER signal is set according to the arbitration table, so that the appropriate master will reach the top priority for the next RR cycles. These actions are synchronized using the LOAD signal.

Thus, the configuration of FIG. 3 modifies the RR scheduling of module 64 in a manner that keeps the same master at the highest RR priority for an entire priority period, then causes another master to have the highest RR priority for the next priority period, and so on. The identities of the masters and the lengths of the priority periods are determined according to table 80.

Typically, the LOAD signal is used when initializing (or enabling) the system. External circuitry begins counting transactions in accordance with arbitration table 80. The external circuitry should be synchronized with the state and the expected initial register values of RR module 64. When the external circuitry is set during operation, the registers of AXI fabric 56 are not in their initial state and values, and should therefore be loaded with these initial values. This loading ensures that the counting of transactions according to table 80 is synchronized with the registers of RR module 64.

Figure 4:
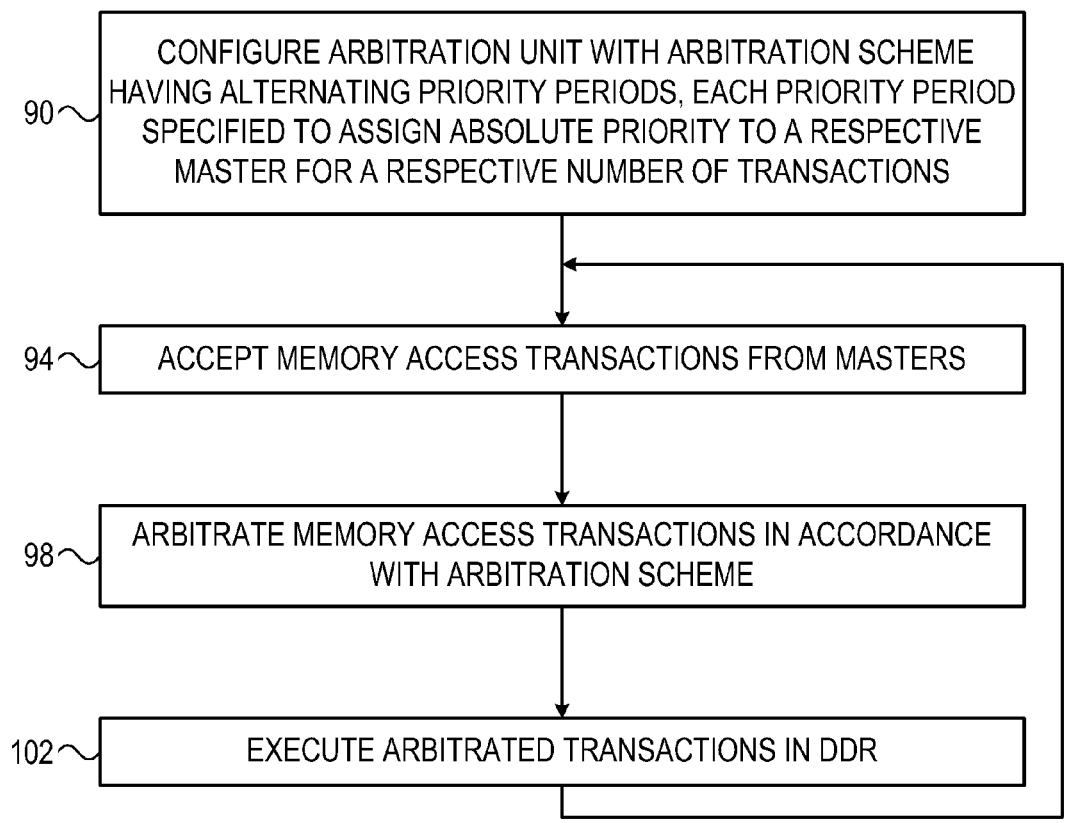
FIG. 4 is a flow chart that schematically illustrates a method for arbitration, in accordance with an embodiment that is described herein.

FIG. 4 is a flow chart that schematically illustrates a method for arbitration, in accordance with an embodiment that is described herein. The description that follows refers to the configuration of FIG. 1, but is similarly applicable to the configurations of FIGS. 2 and 3, or any other suitable system configuration. The method begins at an initialization operation 90, in which arbitration unit 36 and arbitration table 40 are configured with the desired arbitration scheme. Typically, table 40 is configured with a definition of the priority periods—e.g., the length of each priority period, the master having absolute priority in each priority period, and the relative priorities among the other masters (that do not have the absolute priority) in each priority period.

At a transaction input operation 94, arbitration unit 36 accepts memory access transactions from masters 24. At an arbitration operation 98, arbitration unit 36 arbitrates among the transactions in accordance with the pre-configured arbitration scheme, as described above. At an execution operation 102, arbitration unit 102 causes fabric 32 to execute the arbitrated transactions in DDR 28. The method then loops back to transaction input operation 94.

In some embodiments, the arbitration scheme parameters (e.g., priority period lengths) are set for a specific system design based on estimated statistical characteristics of the transactions in the system. In one embodiment, the system design is simulated, e.g., using a behavioral simulation that simulates the high-level specifications and operation of the masters, in order to estimate the statistical characteristics of the transactions of each master. The appropriate arbitration scheme parameters are then selected based on these simulated estimates.

Although the embodiments described herein mainly address memory access in mobile communication terminals, the methods and systems described herein can also be used in other applications. For example, the disclosed techniques can be used in any suitable real-time computing system whose architecture includes masters that compete with one another for access to a limited memory resource. Systems of this sort may comprise, for example, Ethernet switches, packet processors, video gaming consoles, weapon systems, or any other suitable system. Although the embodiments described herein refer mainly to AXI interconnect, the disclosed techniques can be used with any other suitable interconnection interface, such as, for example, the AMBA APB protocol, cited above.

It is noted that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art.

The invention claimed is:

1. Apparatus, comprising:
a plurality of ports, which are configured to connect a memory to a respective plurality of processing units that are configured to access the memory; and
arbitration circuitry, which is configured to grant the processing units access to the memory via the ports in accordance with an arbitration scheme comprising multiple, alternating priority periods, such that in each priority period a respective processing unit is assigned an absolute priority over others of the processing units and the others of the processing units are assigned predefined relative priorities over one another, and such that a length of a given priority period is set to a maximal length that does not violate a latency restriction of the processing unit that is assigned the absolute priority in the given priority period.

2. The apparatus according to claim 1, wherein the arbitration circuitry is configured to measure each priority period by counting a respective predefined number of memory access transactions applied by the processing units.

3. The apparatus according to claim 1, wherein the arbitration circuitry comprises:
a Round-Robin arbiter that is configured to apply Round-Robin scheduling to memory access transactions issued by the processing units to the memory; and
external circuitry, which is connected to the Round-Robin arbiter and is configured to cause the Round-Robin arbiter to apply the alternating priority periods.

4. The apparatus according to claim 3, wherein the Round-Robin arbiter is configured to apply the Round-Robin scheduling within each of multiple priority groups to which the processing units are classified, and wherein the external circuitry is configured to cause the Round-Robin arbiter to apply the alternating priority periods by alternately modifying a classification of the processing units to the priority groups.

5. The apparatus according to claim 4, wherein, in preparation for each priority period, the external circuitry is configured to classify the respective processing unit having the absolute priority to a priority group having a highest priority.

6. The apparatus according to claim 3, wherein the external circuitry is configured to force the Round-Robin arbiter, during the entire duration of each priority period, to assign a highest priority to the respective processing unit having the absolute priority for that priority period.

7. The apparatus according to claim 3, wherein the Round-Robin arbiter operates in accordance with an Advanced eXtensible Interface (AXI) protocol.

8. The apparatus according to claim 1, wherein the arbitration circuitry is configured to apply during each priority period a round-robin scheme among the others of the processing units that are not assigned to absolute priority.

9. A mobile communication terminal comprising the apparatus of claim 1.

10. A chipset for processing signals in a mobile communication terminal, comprising the apparatus of claim 1.

11. A method, comprising:
in a system that includes a plurality of processing units that access a memory, storing a definition of an arbitration scheme comprising multiple, alternating priority periods, such that in each priority period a respective processing unit is assigned an absolute priority over others of the processing units and the others of the processing units are assigned predefined relative priorities over one another, and such that a length of a given priority period is set to a maximal length that does not violate a latency restriction of the processing unit that is assigned the absolute priority in the given priority period;
accepting from the processing units transactions for execution in the memory; and
scheduling the transactions for execution in the memory in accordance with the arbitration scheme.

12. The method according to claim 11, wherein scheduling the transactions comprises measuring each priority period by counting a respective predefined number of memory access transactions applied by the processing units.

13. The method according to claim 11, wherein scheduling the transactions comprises:
using a Round-Robin arbiter, applying Round-Robin scheduling to memory access transactions issued by the processing units to the memory; and
controlling the Round-Robin arbiter so as to cause the Round-Robin arbiter to apply the alternating priority periods.

14. The method according to claim 13, wherein applying the Round-Robin scheduling comprises performing the Round-Robin scheduling within each of multiple priority groups to which the processing units are classified, and wherein controlling the Round-Robin arbiter comprises alternately modifying a classification of the processing units to the priority groups.

15. The method according to claim 14, wherein modifying the classification comprises classifying, in preparation for each priority period, the respective processing unit having the absolute priority to a priority group having a highest priority.

16. The method according to claim 13, wherein controlling the Round-Robin arbiter comprises forcing the Round-Robin arbiter, during the entire duration of each priority period, to assign a highest priority to the respective processing unit having the absolute priority for that priority period.

17. The method according to claim 13, wherein applying the Round-Robin scheduling comprises operating the Round-Robin arbiter in accordance with an Advanced eXtensible Interface (AXI) protocol.

18. The method according to claim 11, wherein scheduling the transactions comprises applying during each priority period a round-robin scheme among the others of the processing units that are not assigned to absolute priority.

19. A method, comprising:
- for a system in which multiple processing units execute transactions in a memory, estimating statistical characteristics of the transactions that are applied by the respective processing units; and
- based on the estimated statistical characteristics, defining an arbitration scheme that applies multiple priority periods for the respective processing units in alternation, such that in each priority period a respective processing unit is assigned an absolute priority over others of the processing units and the others of the processing units are assigned predefined relative priorities over one another, and such that a length of a given priority period is set to a maximal length that does not violate a latency restriction of the processing unit that is assigned the absolute priority in the given priority period.

20. The method according to claim 19, wherein estimating the statistical characteristics comprises simulating the system using a behavioral simulation.

\* \* \* \* \*